US012791438B2

(12) United States Patent
Dong et al.

(10) Patent No.: US 12,791,438 B2
(45) Date of Patent: Nov. 10, 2026

(54) NON-INVASIVE DEVICE FOR SIMULTANEOUS TESTING DYNAMIC CHARACTERISTICS AND INJECTION LAW OF GAS NEEDLE VALVE AND METHOD THEREOF

(71) Applicant: Harbin Engineering University, Harbin City (CN)

(72) Inventors: Quan Dong, Harbin City (CN); Chao Chen, Harbin City (CN); Min Wang, Harbin City (CN); Xiaoyan Wang, Harbin City (CN); Daijun Wei, Harbin City (CN)

(73) Assignee: Harbin Engineering University, Harbin City (CN)

(*) Notice: Subject to any disclaimer, the term of this patent is extended or adjusted under 35 U.S.C. 154(b) by 492 days.

(21) Appl. No.: 18/519,040

(22) Filed: Nov. 26, 2023

(65) Prior Publication Data

US 2025/0052642 A1 Feb. 13, 2025

(30) Foreign Application Priority Data

Aug. 10, 2023 (CN) ......................... 202311005682.0

(51) Int. Cl.

*G01M 15/04* (2006.01)
*F02M 65/00* (2006.01)
*G01D 5/14* (2006.01)

(52) U.S. Cl.

CPC ............ *G01M 15/04* (2013.01); *F02M 65/00* (2013.01); *G01D 5/14* (2013.01)

(58) Field of Classification Search

CPC .... G01M 15/04; G01M 13/00; G01M 13/003; F02M 65/00; F02M 65/001; F02M 65/005; G01D 5/14; G01D 21/02; G01B 7/02

See application file for complete search history.

(56) References Cited

U.S. PATENT DOCUMENTS 4,788,858 A * 12/1988 Liebermann ......... F02M 65/001 73/114.48
4,798,084 A * 1/1989 Takahashi ............ F02M 65/001 73/114.48

(Continued)

FOREIGN PATENT DOCUMENTS

CN 102588179 A * 7/2012 ............. F02M 65/00
CN 108301951 A * 7/2018 ............. F02M 65/00
CN 113188806 A * 7/2021 ............ G01M 15/14

*Primary Examiner* — Freddie Kirkland, III
(74) *Attorney, Agent, or Firm* — Birchwood IP

(57) ABSTRACT

A non-invasive device for simultaneous testing dynamic characteristics and injection law of a gas needle valve and a method therefor are disclosed. The device includes a tested injector, a pressure sensor, a temperature sensor, an eddy current displacement sensor, a constant volume sealed container, and a controller. A nozzle of the tested injector is inserted into a constant volume cavity of the constant volume sealed container; the eddy current displacement sensor is arranged at a lower part of a gas needle valve of the tested injector; the pressure sensor and the temperature sensor are inserted into the constant volume cavity; and the controller is configured to receive displacement data, pressure data, and temperature data, and calculate the injection law of the tested injector based on the pressure data and the temperature data, achieving multi parameters testing of the needle valve lift and injection law in the same time and space.

3 Claims, 2 Drawing Sheets

(56) References Cited

U.S. PATENT DOCUMENTS

| | | | | |
|---|---|---|---|---|
| 6,915,683 | B2 * | 7/2005 | Schoeffel | F02M 65/001 73/116.04 |
| 7,197,918 | B2 * | 4/2007 | Shen | G01M 15/00 73/114.51 |
| 9,027,395 | B2 * | 5/2015 | Mannucci | F02M 65/006 73/114.45 |
| 2007/0240500 | A1 * | 10/2007 | Pollard | F02M 65/00 73/114.48 |
| 2016/0032856 | A1 * | 2/2016 | Shaver | F02D 41/1401 123/482 |

* cited by examiner

NON-INVASIVE DEVICE FOR SIMULTANEOUS TESTING DYNAMIC CHARACTERISTICS AND INJECTION LAW OF GAS NEEDLE VALVE AND METHOD THEREOF

CROSS-REFERENCE TO RELATED APPLICATIONS

This application claims to the benefit of priority from Chinese Application No. 202311005682.0 with a filing date of Aug. 10, 2023, the content of the aforementioned applications, including any intervening amendments thereto, are incorporated herein by reference.

TECHNICAL FIELD

The present disclosure relates to the field of research on the injection characteristics of high-pressure direct injectors, in particular to a non-invasive device for simultaneous testing dynamic characteristics and injection law of a gas needle valve and a method thereof.

BACKGROUND

Considering factors such as progressive emission reduction and fuel maturity, researchers have improved engine combustion efficiency by optimizing combustion modes and injection processes, and adopted low-carbon fuels to replace traditional fuels to reduce carbon emissions at the source. High pressure direct injection technology enables natural gas engines to have better fuel economy and achieve efficient combustion. Compared to natural gas port-fuel-injection technology, it significantly improves inflation efficiency and combustion uniformity, which can further improve thermal efficiency. At present, there are commercial high-pressure direct injection natural gas engines with thermal efficiency exceeding that of diesel engines, which fully proves that high-pressure direct injection technology is the key to fully leveraging the advantages of low-carbon fuels.

The most advanced high-pressure direct injection system uses a dual fuel injector as the final actuator, and achieves dual fuel coaxial staggered injection through layered spray holes on the dual fuel nozzle, which can adapt to the compact cylinder structure of small cylinder diameter engines. At present, research has fully demonstrated that the fuel injection law of direct injection engines is one of the important factors affecting the combustion process in the cylinder and subsequent emission levels. Meanwhile, the motion characteristics of the needle valve are the main supplement to the study of fuel injection characteristics and contribute to the optimization design of the injector. The dual fuel injector has a unique nozzle structure, and the external needle valve head has a large contact surface with the external environment, and the impact of back pressure on the gas injection characteristics is not yet known. In theory, the high-pressure environment inside the engine cylinder can cause changes in the movement of the gas needle valve, affecting the gas injection process and directly affecting the subsequent combustion process. The fuel injection characteristics of the engine under actual high-pressure environment are not yet known, leading to the inability of the engine control system to achieve fuel MAP calibration and precise control. However, the testing methods for the injection law and needle valve lift of the injector are still in the exploratory stage.

SUMMARY

The objective of the present disclosure is to provide a non-invasive device for simultaneous testing dynamic characteristics and injection law of a gas needle valve and a method therefor, and to achieve simultaneous multi parameter testing of the needle valve lift and injection law in the same time and space.

To achieve the above objective, the present disclosure provides the following solution:

A non-invasive device for simultaneous testing dynamic characteristics and injection law of a gas needle valve, including a tested injector, a pressure sensor, a temperature sensor, an eddy current displacement sensor, a constant volume sealed container, and a controller.

A nozzle of the tested injector is inserted into a constant volume cavity of the constant volume sealed container;

The eddy current displacement sensor is arranged at a lower part of a gas needle valve of the tested injector;

The pressure sensor and the temperature sensor are inserted into the constant volume cavity; and The controller is configured to receive displacement data collected by the eddy current displacement sensor, pressure data collected by the pressure sensor, and temperature data collected by the temperature sensor, and calculate the injection law of the tested injector based on the pressure data and the temperature data.

Optionally, the device further includes a high-pressure oil source and a high-pressure gas source; the high-pressure oil source is connected to the tested injector to provide fuel to the tested injector; and the high-pressure gas source is connected to the tested injector to provide gas to the tested injector.

Optionally, the device further includes a back pressure and pressurization valve and a pressure relief valve, and the back pressure and pressurization valve and the pressure relief valve are arranged on the constant volume sealed container.

A method for simultaneous testing dynamic characteristics and injection law of a gas needle valve is further provided by the present disclosure, which includes:

- Obtaining the displacement data collected by the eddy current displacement sensor; the eddy current displacement sensor is arranged at the lower part of the gas needle valve of the tested injector;
- Obtaining the pressure data collected by the pressure sensor; the pressure sensor and the temperature sensor are inserted into the constant volume cavity of the constant volume sealed container; and the nozzle of the tested injector is inserted into the constant volume cavity of the constant volume sealed container;
- Calculating the injection law of the tested injector based on the pressure data and the temperature data.

Optionally, calculating the injection law of the tested injector based on the pressure data and the temperature data specifically including:

- Determining temperature changes in the constant volume cavity based on the temperature data;
- Determining a calculation method of a injection volume of the tested injector based on the temperature changes;
- Determining the injection law based on the determined calculation method of the injection volume.

Optionally, an expression of the injection law is:

$$\dot{M} = \frac{VM\Delta P_1}{RT_0\Delta P_2}\frac{dp}{dt}$$

Wherein, V is specific volume; M is molar mass; p is pressure inside the cavity; R is an adiabatic coefficient; To is temperature inside the cavity.

According to the specific embodiments provided by the present disclosure, the technical effects are disclosed as below:

The present disclosure provides a non-invasive device for simultaneous testing dynamic characteristics and injection law of a gas needle valve and a method therefor. The needle valve lift measurement is achieved by arranging an eddy current displacement sensor at the lower part of the gas needle valve, and a constant volume sealed container is designed downstream of the injector and a pressure sensor is installed inside to obtain the injection law, such that the two methods are combined to achieve the same time and space testing of the needle valve lift and injection law testing.

BRIEF DESCRIPTION OF THE DRAWINGS

In order to provide a clearer illustration of the embodiments of the present disclosure or the technical solutions in the prior art, a brief introduction will be given to the accompanying drawings required in the embodiments. It is apparent that the accompanying drawings in the following description are only some embodiments of the present disclosure. For ordinary skilled person in the art, other accompanying drawings can be obtained based on these drawings without any creative labor.

SYMBOL DESCRIPTION

1—tested injector, 2—high-pressure oil source, 3—high-pressure gas source, 4—constant volume sealed container, 5—back pressure and pressurization valve, 6—pressure sensor, 7—temperature sensor, 8—pressure relief valve, 9—eddy current displacement sensor.

DETAILED DESCRIPTION OF THE EMBODIMENTS

The following will provide a clear and complete description of the technical solution in the embodiments of the present disclosure, in conjunction with the accompanying drawings. Obviously, the described embodiments are only a part of the embodiments of the present disclosure, not all of them. Based on the embodiments in the present disclosure, all other embodiments obtained by ordinary skilled person in the art without creative labor fall within the scope of the present disclosure.

At present, the testing methods for the needle valve motion characteristics of engine fuel injectors are mostly aimed at gasoline or diesel injectors. Optical testing methods are one of the effective means to obtain the needle valve lift. In current, testing the needle valve lift by incorporating a displacement sensor into the injector is a widely used method.

1) The disadvantages of optical testing methods: high cost and complex testing principles have prevented the optical testing method widespread application. 2) The disadvantage of testing method of embedding a displacement sensor in the injector is that this method belongs to invasive testing, on the one hand, this method requires special processing of the injector to achieve the installation of the displacement sensor; on the other hand, the introduction of displacement sensors will inevitably cause changes in the internal flow field structure of the injector, leading to changes in its operating characteristics. Moreover, existing technology cannot achieve the for simultaneous time-space testing of needle valve lift and injection law of dual fuel injectors for high-pressure direct injection natural gas engines.

Therefore, the present disclosure provides a non-invasive simultaneous time-space testing device and a method for the dynamic characteristics and injection law of a high-pressure direct injection injector structure. The needle valve lift measurement is achieved by arranging an eddy current displacement sensor at the lower part of the gas needle valve, and based on this, a constant volume sealed container is designed downstream of the injector and a pressure sensor is installed internally to obtain the injection law, the combination of the two methods achieved simultaneous testing of needle valve lift and injection law under the same time and space.

In order to make the above objectives, features, and advantages of the present disclosure more apparent and understandable, the following will provide further detailed explanations of the present disclosure in conjunction with the accompanying drawings and specific embodiments.

Embodiment 1

Figure 1:
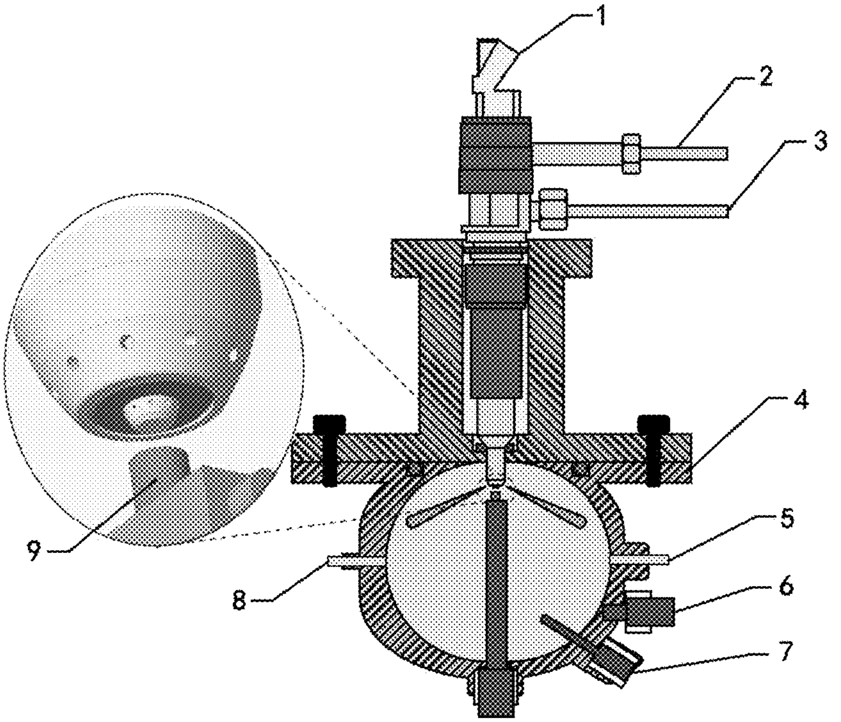
FIG. 1 is a structural diagram of a device for simultaneous time-space testing dynamic characteristics and injection law of gas needle valve provided by the embodiment of the present disclosure.

As shown in FIG. 1, a non-invasive device for simultaneous testing dynamic characteristics and injection law of a gas needle valve is provided in the present embodiment, which includes: a tested injector (1), a pressure sensor (6), a temperature sensor (7), an eddy current displacement sensor (9), a constant volume sealed container, and a controller.

The nozzle of the tested injector (1) is inserted into a constant volume cavity (4) of the constant volume sealed container.

The eddy current displacement sensor (9) is arranged at the lower part of the gas needle valve of the tested injector (1). The measurement principle of needle valve lift is direct. The eddy current displacement sensor (9) determines the displacement signal through the magnetic field between it and the tested object. By arranging the eddy current displacement sensor (9) at the lower part of the gas needle valve of the injector (1), the needle valve lift test is simultaneously carried out based on the injection law.

The pressure sensor (6) and the temperature sensor (7) are inserted into the constant volume cavity (4).

The controller is configured to receive displacement data collected by the eddy current displacement sensor (9), pressure data collected by the pressure sensor (6), and temperature data collected by the temperature sensor (7), and calculate the injection law of the tested injector (1) based on the pressure data and the temperature data.

The device further includes a high-pressure oil source (2) and a high-pressure gas source (3). The high-pressure oil source (2) is connected to the tested injector (1) to provide fuel to the tested injector (1), and the high-pressure gas source (3) is connected to the tested injector (1) to provide gas to the tested injector (1).

The device further includes a back pressure and pressurization valve (5) and a pressure relief valve (8), and the back pressure and pressurization valve (5) and the pressure relief valve (8) are arranged on the constant volume cavity (4). The back pressure and pressurization valve (5) and the pressure relief valve (8) are both arranged on the wall of the constant volume cavity (4).

Device installation: Firstly, the nozzle part of the injector (1) is inserted into the constant volume cavity (4), and the temperature sensor (7) is used to measure the internal temperature (4) of the constant volume cavity (4).

The pressure sensor (6) is inserted into the constant volume cavity (4) for measuring transient pressure signal changes caused by the jet process. The eddy current displacement sensor (9) is installed through a fixture and aligned with the external injector (1) gas needle valve of the injector. The pressure relief valve (8) is configured to connect the constant volume cavity (4) with the atmospheric environment, and to discharged the gas in the constant volume cavity (4). The back pressure and pressurization valve (5) is configured to supply back pressure to the constant volume cavity (4).

The testing operation process of the device: First, turn on the high-pressure oil source (2) and the high-pressure gas source (3), adjust the diesel and gas pressure to the predetermined test pressure, and complete the experimental preparation work. Secondly, during the test, gas is first introduced into the constant volume cavity (4) through the back pressure and pressurization valve (5). After the cavity pressure reaches the predetermined back pressure, the back pressure and pressurization valve (5) is closed. Finally, the drive current is sent to the injector (1) through the injector drive control system, the injector (1) responds, the needle valve begins to move, and the injection process begins. The pressure sensor (6) collects the pressure signal and calculates the injection law through equation (6). At the same time, the displacement sensor collects the needle valve lift signal to achieve simultaneous time-space testing of the injection law and the needle valve signal, completing the testing process.

Figure 3:
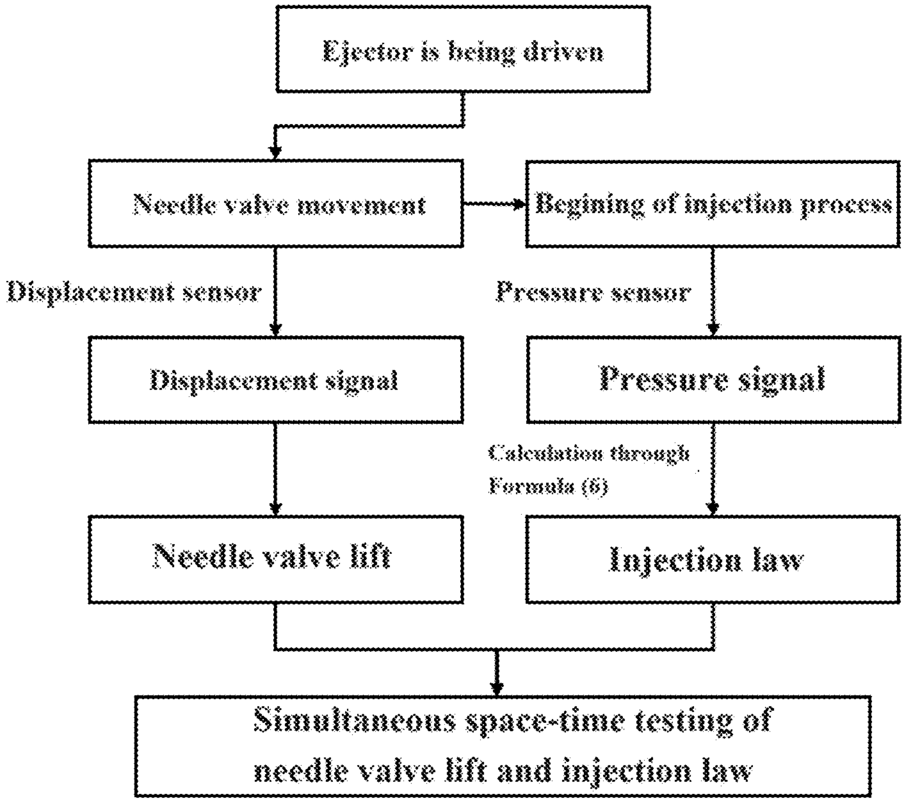
FIG. 3 is a testing principle diagram of a device for simultaneous time-space testing dynamic characteristics and injection law of gas needle valve provided by the embodiment of the present disclosure.

As shown in FIG. 3, the testing principle is:

1) Principle of Injection Law Testing:

The gas emitted by the injector (1) will enter the constant volume cavity (4) in downstream, generating a corresponding pressure increase, and the pressure signal is collected by the pressure sensor (6). The calculation process of the injection law is as follows:

Ideal gas state equation:

$$m = P\frac{VM}{RT} \tag{1}$$

If the temperature during injection can be ignored, the formula is obtained:

$$\frac{\mathrm{dm}}{dt} = \frac{VM}{RT}\frac{dp}{dt} \tag{2}$$

Then, the injection volume can be obtained by the formula below:

$$\Delta m = \frac{VM}{RT}\Delta P \tag{3}$$

Assuming that the temperature increases uniformly over time during the injection process, there is a relationship between formulas (4) and (5):

$$\Delta m = \frac{VM}{R}\int_0^{t_{inj}}\frac{d(TP)}{dt}dt \tag{4}$$

$$\Delta m = \frac{VM\Delta P_1}{RT_0\Delta P_2}\int_0^{t_{inj}}\frac{dp}{dt}dt \tag{5}$$

Then, the injection law can be obtained:

$$\dot{m} = \frac{VM\Delta P_1}{RT_0\Delta P_2}\frac{dp}{dt} \tag{6}$$

Wherein m is the mass flow rate; V is the specific volume; M is the molar mass; p is the pressure inside the cavity; R is the adiabatic coefficient; To is the temperature inside the cavity.

Figure 2:
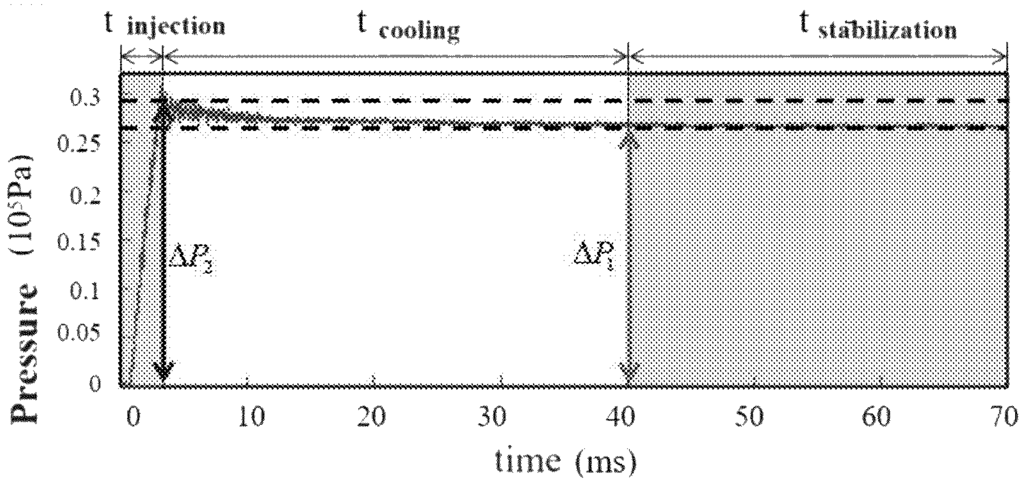
FIG. 2 is an injection law curve provided by the embodiment of the present disclosure.

As shown in FIG. 2, after the end of a single injection, the pressure inside the cavity does not remain constant, but slowly decreases and approaches a fixed value. This is because during high-pressure pulse injection, the temperature suddenly increases, and the pressure inside the cavity increases to ΔP2. After the injection is completed, the gas exchanges heat with the inner wall of the cavity, the temperature gradually decreases, and the pressure slowly drops to a fixed value ΔP1. $t_{inj}$ represents the injection time.

2) Principle of Needle Valve Lift Test:

The measurement principle of needle valve lift is direct. The eddy current displacement sensor (9) determines the displacement signal through the magnetic field between it and the tested object. By arranging the eddy current displacement sensor (9) at the lower part of the gas needle valve of the tested injector (1), the needle valve lift test is simultaneously carried out based on the injection law.

In this embodiment, the eddy current displacement sensor is applied for the first time in the dynamic parameter testing system of the injector, achieving non-invasive testing of the unique nozzle structure of the dual fuel injector with an external gas needle valve. Secondly, the testing device for needle valve lift and injection law has high spatial resolution, which can be simultaneously arranged in the testing system to achieve simultaneous time-space testing of needle valve lift and injection law. By adopting the principle of non-invasive needle valve lift testing, there no is damage to the original internal mechanical-hydraulic-pneumatic multi physical field structure, eliminating errors caused by changes in the internal structure of the injector.

Embodiment 2

As shown in FIG. 3, a method for simultaneous testing dynamic characteristics and injection law of a gas needle valve is provided in the present embodiment, wherein the method includes the steps below.

(1) Obtaining the displacement data collected by the eddy current displacement sensor (9), and the eddy current displacement sensor (9) is arranged at the lower part of the gas needle valve of the tested injector (1).

(2) Obtaining the pressure data collected by the pressure sensor (6), the pressure sensor (6) and the temperature sensor (7) are inserted into the constant volume cavity (4) of the constant volume sealed container, and the nozzle of the tested injector (1) is inserted into the constant volume cavity (4) of the constant volume sealed container.

(3) Calculating the injection law of the tested injector (1) based on the pressure data and the temperature data. The step specifically includes:

Determining temperature changes in the constant volume cavity (4) based on the temperature data;

Determining a calculation method of a injection volume of the tested injector (1) based on the temperature changes;

Determining the injection law based on the determined calculation method of the injection volume.

The present disclosure can achieve simultaneous testing of needle valve lift and injection law in the same injection cycle of the injector. Compared with existing injection law testing methods and needle valve lift testing methods, it has advantages in short testing cycle and good economy, which can be used to deeply understand the dynamic performance of the injector and provide reference data for optimizing the performance design of the injector.

Embodiment 3

This embodiment provides a system for simultaneous testing dynamic characteristics and injection law of a gas needle valve, which includes a first data acquisition module, a second data acquisition module, and a injection law calculation module.

The first data acquisition module is configured to obtain displacement data collected by the eddy current displacement sensor (9), and the eddy current displacement sensor (9) is arranged at the lower part of the gas needle valve of the tested injector (1).

The second data acquisition module is configured to obtain pressure data collected by the pressure sensor (6), the pressure sensor (6) and the temperature sensor (7) are inserted into the constant volume cavity (4) of the constant volume sealed container, and the nozzle of the tested injector (1) is inserted into the constant volume cavity (4) of the constant volume sealed container.

The injection law calculation module is configured to calculate the injection law of the tested injector (1) based on the pressure data and the temperature data.

Embodiment 4

This embodiment provides an electronic device, including a memory and a processor. The memory is configured to store computer programs, and the processor runs computer programs to enable the electronic device to perform the method for simultaneous time-space testing the dynamic characteristics and injection law of the gas needle valve in embodiment 1.

Optionally, the electronic device mentioned above may be a server.

In addition, the embodiment of the present disclosure also provides a computer-readable storage medium, which stores a computer program. When the computer program is executed by the processor, the dynamic characteristics and injection law of the gas needle valve in embodiment 1 are tested in the same time and space.

The embodiments of the present disclosure can be provided as methods, systems, or computer program products. Therefore, the present disclosure can take the form of complete hardware embodiments, complete software embodiments, or embodiments combining software and hardware aspects. Moreover, the present disclosure may take the form of a computer program product implemented on one or more computer available storage media (including but not limited to disk storage, CD-ROM, optical storage, etc.) containing computer available program code.

The present disclosure is described with reference to the flowchart and/or block diagram of the method, device (system), and computer program product according to the embodiments of the present disclosure. It should be understood that each process and/or block in a flowchart and/or block diagram can be implemented by computer program instructions, as well as the combination of processes and/or blocks in the flowchart and/or block diagram. These computer program instructions can be provided to processors of general-purpose computers, specialized computers, embedded processors, or other programmable data processing devices to generate a machine that generates instructions executed by processors of computers or other programmable data processing devices to implement functions specified in a flowchart or multiple flows and/or a block diagram or multiple blocks.

These computer program instructions can also be stored in computer readable memory that can guide a computer or other programmable data processing device to work in a specific way, causing the instructions stored in the computer readable memory to generate a manufacturing product including instruction devices, which implement the functions specified in one or more processes and/or blocks of a flowchart.

These computer program instructions can also be loaded onto a computer or other programmable data processing device to perform a series of operational steps on the computer or other programmable device to generate computer-implemented processing. Thus, the instructions executed on the computer or other programmable device provide steps for implementing the functions specified one or more processes in a flowchart and/or one or more blocks in a block diagram.

The various embodiments in this disclosure are described in a progressive manner, and each embodiment focuses on the differences from other embodiments. The same and similar parts between each embodiment can be referred to each other. For the system disclosed in the embodiments, due to its correspondence with the methods disclosed in the embodiments, the description is relatively simple. Please refer to the method section for relevant information.

In this disclosure, embodiments have been applied to illustrate the principles and implementation methods of the present disclosure. The above embodiments are only used to help understand the methods and core ideas of the present disclosure. At the same time, for ordinary skilled person in the art, there may be changes in specific implementation methods and application scope based on the ideas of the present disclosure. In summary, the content of this specification should not be understood as a limitation to the present disclosure.

What is claimed is:

1. A non-invasive device for simultaneous testing dynamic characteristics and injection law of a gas needle valve, comprising: a tested injector, a pressure sensor, a temperature sensor, an eddy current displacement sensor, a constant volume sealed container, and a controller;

a nozzle of the tested injector is inserted into a constant volume cavity of the constant volume sealed container;

the eddy current displacement sensor is arranged at a lower part of a gas needle valve of the tested injector;

the pressure sensor and the temperature sensor are inserted into the constant volume cavity; and the controller is configured to receive displacement data collected by the eddy current displacement sensor, pressure data collected by the pressure sensor, and temperature data collected by the temperature sensor, and calculate the injection law of the tested injector based on the pressure data and the temperature data.

2. The device according to claim 1, wherein the device further comprises a high-pressure oil source and a high-pressure gas source; the high-pressure oil source is connected to the tested injector to provide fuel to the tested injector; and the high-pressure gas source is connected to the tested injector to provide gas to the tested injector.

3. The device according to claim 1, wherein the device further comprises a back pressure and pressurization valve and a pressure relief valve, and the back pressure and pressurization valve and the pressure relief valve are arranged on the constant volume sealed container.

* * * * *